United States Patent [19]

Otsuka et al.

[11] Patent Number: 5,297,133
[45] Date of Patent: Mar. 22, 1994

[54] OPTICAL DISC CARTRIDGE AND MECHANISM FOR PREVENTING AN INCORRECT INSERTION OF A CARTRIDGE

[75] Inventors: Yasuo Otsuka, Hase Kamakura; Nobuhiro Katase; Tohru Sasaki, both of Yokohama, all of Japan

[73] Assignee: Hitachi, Ltd., Tokyo, Japan

[21] Appl. No.: 224,728

[22] Filed: Jul. 27, 1988

[30] Foreign Application Priority Data

Jul. 27, 1987 [JP] Japan ................. 62-185471
Nov. 9, 1987 [JP] Japan ................. 62-280919

[51] Int. Cl.⁵ .......................................... G11B 23/03
[52] U.S. Cl. ............................... 369/291; 360/133
[58] Field of Search ................. 369/291; 360/133; 206/309, 312, 444

[56] References Cited

U.S. PATENT DOCUMENTS

| | | | |
|---|---|---|---|
| 4,685,017 | 8/1987 | Swinburne | 360/133 |
| 4,688,206 | 8/1987 | Nakagawa et al. | 369/291 |
| 4,698,714 | 10/1987 | Sugawara et al. | 360/133 |
| 4,710,831 | 12/1987 | Nishimura | 360/99.02 |
| 4,837,758 | 6/1989 | Motoyama et al. | 369/13 |
| 4,849,844 | 7/1989 | Kato | 360/133 |
| 4,858,050 | 8/1989 | Ashe et al. | 369/291 X |

FOREIGN PATENT DOCUMENTS

| | | |
|---|---|---|
| 97221 | 4/1984 | European Pat. Off. . |
| 0144974 | 6/1985 | European Pat. Off. ........ 360/133 A |
| 204921 | 12/1986 | European Pat. Off. . |
| 219980 | 4/1987 | European Pat. Off. . |
| 248908 | 12/1987 | European Pat. Off. . |
| 3414587 | 10/1984 | Fed. Rep. of Germany ... 360/133 A |
| 0033381 | 2/1987 | Japan ............................... 360/133 A |
| 2082371 | 3/1982 | United Kingdom . |

Primary Examiner—Stuart S. Levy
Assistant Examiner—Kevin M. Watkins
Attorney, Agent, or Firm—Antonelli, Terry, Stout & Kraus

[57] ABSTRACT

An optical disc cartridge provided with a mechanism for preventing incorrect insertion of a cartridge. A cut-off portion is provided at a head and side portion at an inserting side of, for example, a 3.5" erasable optical disc cartridge. The cut-off portion is located at an side opposite to a corresponding cut-off portion used in a 3.5" (86 mm) floppy disc cartridge. A stopper is provided in a cartridge insertion portion of the reproducing apparatus to prevent incorrect insertion of the cartridge and is located to correspond to the location of the cartridge cut-off portion. A depression or the like is provided at a front end of the cartridge at a portion symmetrical about an axis to an edge of a shutter of the cartridge where a shutter opening lever normally strikes when the cartridge is inserted into the cartridge insertion portion.

10 Claims, 5 Drawing Sheets

OPTICAL DISC CARTRIDGE AND MECHANISM FOR PREVENTING AN INCORRECT INSERTION OF A CARTRIDGE

BACKGROUND OF THE INVENTION

The present invention relates to an optical disc cartridge construction having a mechanism for preventing incorrect insertion of the cartridge and, more particularly, to a 3.5" optical disc cartridge with such a mechanism.

There are currently three kinds of "write-once" type of optical discs on the market, namely 12", 8", 5.25". More recently, a 3.5" erasable optical disc has been under development. For designing a 3.5" erasable optical disc cartridge, a standard 3.5" magnetic floppy disc cartridge based on the U.S. "ANSI X 3B8/86-57" proposal has been helpful. The structure of a 3.5" magnetic floppy disc is shown in U.S. Pat. No. 4,546,397. The diameter of a 3.5" magnetic floppy disc is 86 mm, the width of the cartridge is 90 mm, the length of the cartridge is 94 mm, and the cartridge thickness is 3.3 mm. The diameter of a 3.5" erasable optical disc is 86 mm, the cartridge width is 90 mm, the cartridge length is 94 mm and the cartridge thickness is 6 mm or 8 mm.

In a reproducing apparatus for a 3.5" floppy disc, accidental insertion of the 3.5" erasable optical disc cartridge can be prevented because the aperture opening of the reproducing apparatus for inserting the floppy disc cartridge is smaller than the thickness of the 3.5" erasable optical disc cartridge. However, in a reproducing apparatus for a 3.5" erasable optical disc, a 3.5" floppy disc which is thinner than its optical disc counterpart can accidentally be inserted into an aperture of the reproducing apparatus for the optical disc cartridge. In such a case, the optical head for retrieving data in the reproducing apparatus or a disc rotating portion can be damaged.

SUMMARY OF THE INVENTION

An object of the present invention is to provide a 3.5" erasable optical disc cartridge which has a mechanism for preventing an incorrect insertion of a different kind of cartridge in an incompatible reproducing apparatus.

A further object of the present invention is to provide a cartridge for preventing erroneous upside down insertion of a cartridge which has a antisymmetrical shutter location.

In accordance with the present invention, a cut-off portion is provided at a head and side portion at an inserting side of the 3.5" erasable optical disc cartridge. The cut-off portion is located at an opposite side to a corresponding cut-off portion used in the 3.5" floppy disc cartridge.

Furthermore, in the present invention, a stopper is provided in a cartridge insertion portion of the reproducing apparatus as a mechanism to prevent incorrect insertion of the cartridge. The stopper corresponds to the location of the cut-off portion of the cartridge. In case of the incorrect insertion of the cartridge, the stopper prevents further cartridge movement.

Additionally, in accordance with the present invention, two kinds of levers can be provided. The first lever is used for opening the shutter at the time of cartridge insertion. The second lever is used for contacting the optical disc with a motor rotating portion. A second stopper can also be provided in the present invention for stopping the cartridge through contact with the first lever. The second stopper is located at the position where the second lever cannot touch the cartridge if the shutter is still closed.

In accordance with the aforementioned structure, the cartridge, when correctly placed in the reproducing apparatus, just misses touching the stopper, which otherwise prevents incorrect insertion of the optical disc cartridge, because of the existence of the cut-off portion on the cartridge. In case of a mistaken insertion of a 3.5" magnetic floppy disc cartridge which is a different cartridge incompatible with an optical disc reproducing apparatus, the stopper in the reproducing apparatus contacts a non-cut-off portion of the 3.5" magnetic floppy disc cartridge, thereby preventing incorrect insertion of the floppy disc cartridge.

If the first lever misses contact with the shutter, the first lever will slide on the front edge of the shutter and forward into the reproducing apparatus at a slightly advanced condition compared with its normal position, so that the cartridge will hit the second stopper through the first lever and stops further movement of the second lever. By stopping the movement of the second lever, damage to an information-retrieving optical head in the reproducing apparatus or to a disc rotating portion is prevented.

Still further, a stopper, such as a depression, is provided at a front end of the cartridge and at a portion symmetrically about an axis to an edge of the shutter where the shutter opening lever normally hits when the cartridge is properly inserted in the reproducing apparatus. When the cartridge is improperly inserted, the shutter opening lever is stopped by the depression provided at the front end of the cartridge. The rotating movement of the lever is stopped, and the insertion of the cartridge is also stopped because the lever operates as a barrier.

BRIEF DESCRIPTION OF THE DRAWINGS

These and other features, objects and advantages of the present invention will become more apparent from the following description when taken in conjunction with the accompanying drawings wherein:

FIGS. 11A, 11B, 11C illustrate a further embodiment of the present invention wherein FIG. 11A is an elevation view, FIG. 11B is a front plane view of the cartridge of FIG. 11A, and FIG. 11C is a cross sectional view taken along line E—E in FIG. 11B.

DETAILED DESCRIPTION OF PRESENTLY PREFERRED EMBODIMENTS

Figure 1:
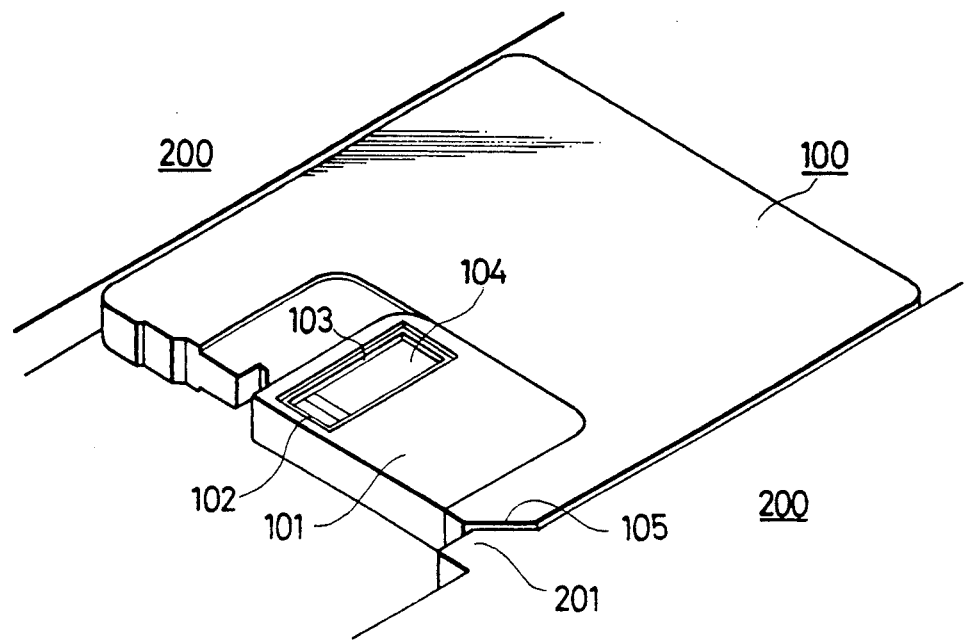
FIG. 1 is a perspective view showing a top side of an optical disk cartridge embodiment of the present invention.
Figure 2:
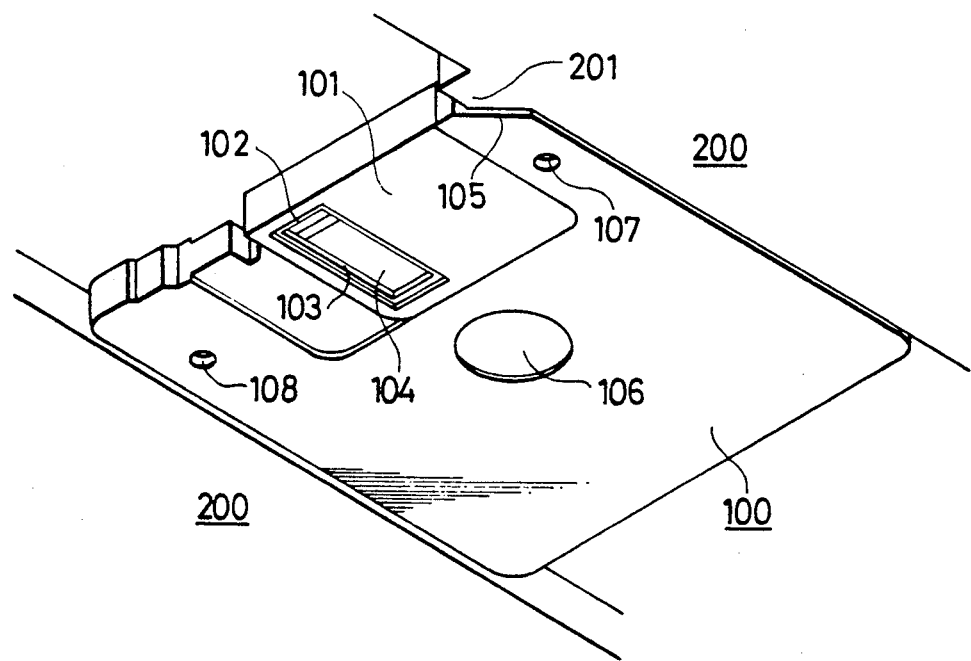
FIG. 2 is a perspective view of the opposite side of the cartridge shown in FIG. 1.

In FIGS. 1 and 2, the reference numeral 100 designates an optical disc cartridge case which receives and protects an optical disc 104 inside. A cartridge inserting portion 200 is provided in an information reproducing apparatus which, for purposes of clarity, is not shown in detail. A shutter 101 slides open at the time the cartridge 100 is inserted into the information reproducing apparatus. An aperture 102 is provided on the shutter 101, and an aperture 103 is provided on the cartridge 100. An aperture 106 is centrally located on the cartridge case 100 for inserting a conventional motor rotating portion (not shown) for rotating the optical disc 104. Location holes 107, 108 are provided for prescribing dimensions of parts of the cartridge 100 for standardization purposes. The location holes 107 and 108 are also used to accurately align the cartridge 100 in the cartridge inserting portion 200. A cut-off portion 105 is provided at one side of the inserting end or head of the cartridge 100 and at the opposite side of the 3.5" magnetic floppy disc cartridge standard based on the U.S. "ANSI X 3B8/86-57" proposal. A stopper 201 for preventing the incorrect insertion of a cartridge other than an optical disc cartridge with a correctly located cut-off portion 105 is provided in the cartridge inserting portion 200 to cooperate with the cut-off portion 105.

The optical disc 104 in the present invention includes an optical disc of a reproducing-only type comprising uneven pits, an optical disc of a write-once type using a hole-melting, a phase change, and an organic dye, and an optical disc of the erasable type using a magnetic-opto, and a phase change.

Figure 3:
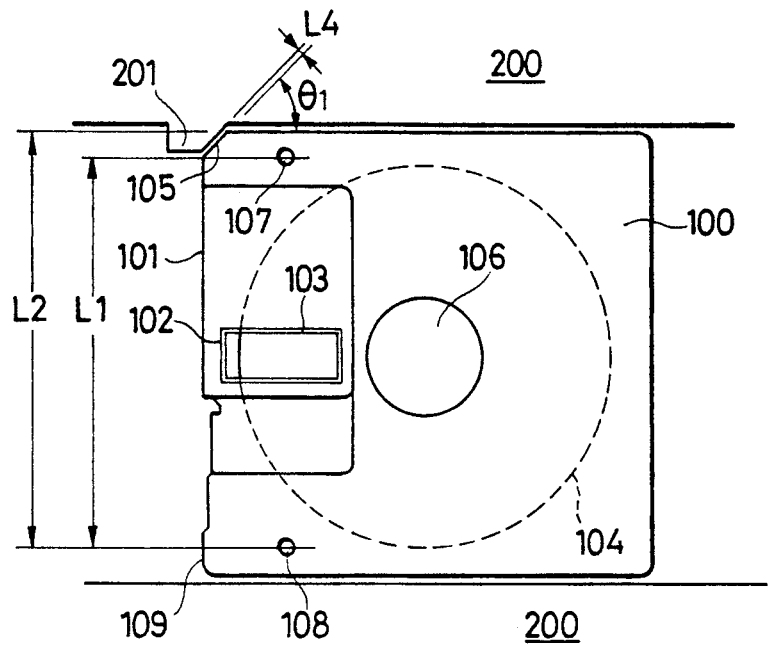
FIG. 3 is a bottom view of the cartridge shown in FIG. 1.

As shown in FIG. 3, the cut-off portion 105 is located at the opposite side of a corresponding cut-off portion used in a 3.5" magnetic floppy disc cartridge. In other words, there is no cut-off portion at the opposite side portion 109 where in a 3.5" magnetic floppy disc there is normally provided a cut-off portion. Furthermore, the stopper 201 is provided in the cartridge inserting portion 200 to cooperate with the cut-off portion 105. On one hand, when the cartridge 100 having the cut-off portion 105 is inserted, the cartridge 100 can be set in the proper position without actually touching or abutting against the stopper 201. On the other hand, if the wrong type of cartridge, for example, the 3.5" magnetic floppy disc cartridge is attempted to be inserted in the reproducing apparatus, a side edge portion of the wrong cartridge hits against the stopper 201 before the cartridge is fully received in the aperture, and the cartridge cannot be inserted further into the information reproducing apparatus. Since the incorrect insertion of the wrong cartridge can be prevented, damage to an optical head for retrieving data in the reproducing apparatus or to a disc rotating portion can be prevented.

If the following dimensions to the reference hole 108 are selected as the location of the cut-off portion 105 in the cartridge of the present invention, the profiles of the optical disc cartridge of the present and of the standard magnetic floppy disc are almost the same, thereby simplifying the design and production of the cartridge inserting portion.

L1 = 80 mm
L2 = 85 mm
θ1 = 45 deg

The distance between the cut-off portion 105 and the stopper 201 is not less than about L4 = 0.5 mm at the narrowest portion.

The above described dimensions are merely exemplary. Other dimensions can also be used without departing from a concept of the present invention, i.e. as long as the cut-off portion 105 is provided at the side opposite to the cut-off portion on the 3.5" magnetic floppy disc so that the incorrect insertion of a 3.5" magnetic floppy disc into the information reproducing apparatus can be prevented.

Figure 4:
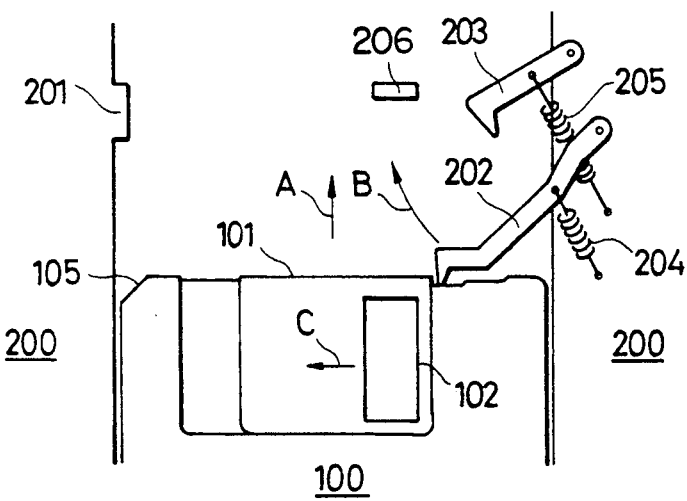
FIGS. 4 and 5 are plan views of another embodiment of the present invention.
Figure 5:
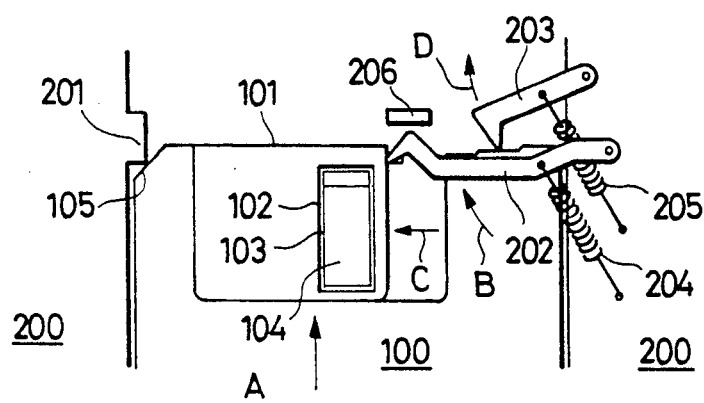

In FIGS. 4 and 5, a first lever 202 is provided for opening the shutter at the time of insertion of the cartridge 100. A second lever 203 operates the motor rotating portion. The first lever 202 and the second lever 203 are biased toward their normal position by springs 204 and 205. A stopper 206 prevents the operation of the second lever 203 when the cartridge 100 is inserted into the reproducing apparatus and the shutter 101 is closed.

FIGS. 4 and 5 demonstrate the situation when the cartridge 100 is inserted into the reproducing apparatus correctly. After inserting the cartridge 100 along the cartridge inserting portion 200 in a direction indicated by an arrow A, the first lever 202 contacts a side edge of the shutter 101, rotates in a direction indicated by an arrow B, and slides the shutter 101 in a direction indicated by an arrow C in response to the insertion of the cartridge 100. Further insertion of the cartridge 100 causes the edge of the cartridge 100 to touch the second lever 203, and pushes lever 203 to operate a motor rotating portion through electrical circuitry in a conventional manner. A center area of the optical disc 104 is called a hub, and is made of metal for magnetic clamping. The motor rotating portion comprises a motor and a magnetic turntable. The turntable couples with the hub by magnetic force through an aperture 106 of the cartridge, and transmits rotating power of the motor to the optical disc 104. In this state, the aperture 102 of the shutter 101 coincides with the aperture 103 of the cartridge 100, and the information reproducing apparatus is in an operative mode.

If the first lever 202 does not catch the edge of the shutter 101, the first lever 202 rotates in the direction of arrow B and moves along the front edge of the shutter 101. In this abnormal condition, the first lever 202 will move into the reproducing apparatus in advance of its normal position when it slides the shutter in the direction of arrow C as shown in FIGS. 4 and 5. As a result, the first lever 202 riding on the cartridge 100 hits the second stopper 206. By stopping the movement of the second lever 203, damage to an information-retrieving optical head in the reproducing apparatus or to a disc rotating portion is prevented.

Figure 6:
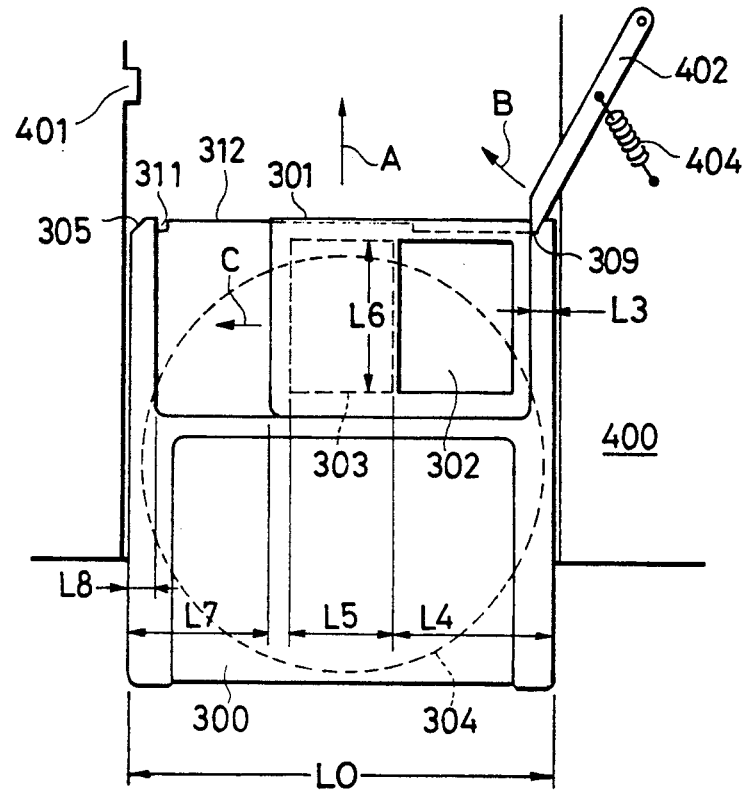
FIGS. 6 and 7 are explanatory plan views of still another embodiment of the present invention.
Figure 7:
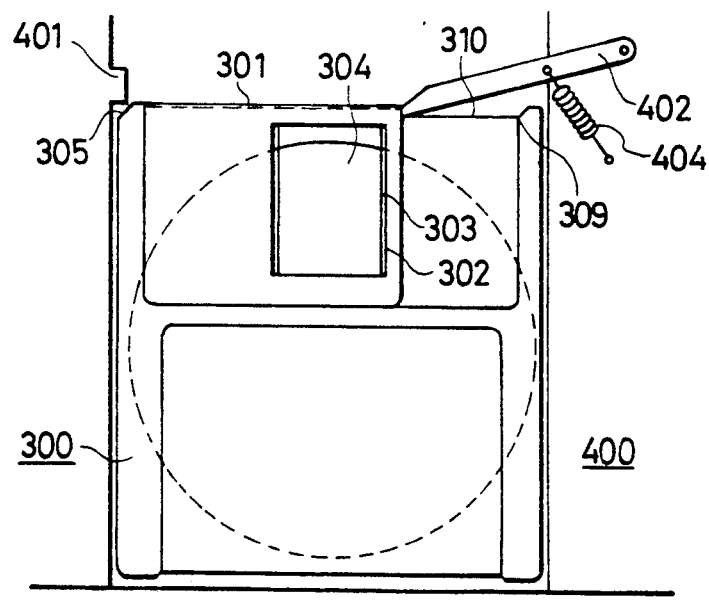

In FIGS. 6 and 7, there is shown another embodiment of an optical disc cartridge 300. An optical disc 304 is operatively held in the optical disc cartridge 300. A shutter 301, a front edge of which has an asymmetrical shape in a direction of insertion shown by arrow A. An aperture 302 is provided on the shutter 301, and a corresponding aperture 303 is provided at the cartridge 300 which is configured to be inserted into an information reproducing apparatus 400. A lever 402 opens the shutter 301 and is biased toward the nonoperating condition by a spring 404. A stopper 401 is provided to cooperate with a cut-off portion 305.

Certain dimensions of the cartridge 300 are as follows:

| | | | |
|---|---|---|---|
| L0 = 90 mm, | L3 = 5 mm, | L4 = 34 mm, | L5 = 22 mm |
| L6 = 32 mm, | L7 = 30 mm, | L8 = 5 mm | |

FIGS. 6 and 7 demonstrate a situation where the cartridge 300 is inserted into the reproducing apparatus 400 in the correct way. After inserting the cartridge 300 along the cartridge inserting portion 400 in a direction indicated by the arrow A, the lever 402 strikes a front edge 309 of the cartridge 300 and a side edge of the shutter 301, and rotates in a direction indicated by an arrow B. The head of the lever 402 slides along the front edge 310 of the cartridge 300 and then slides the shutter 301 in a direction indicated by an arrow C in response to the insertion of the cartridge 300 in the reproducing apparatus. At this stage, the aperture 302 of the shutter 301 coincides with the aperture 303 of the cartridge 300, and the information reproducing apparatus is in an operative condition.

Figure 8:
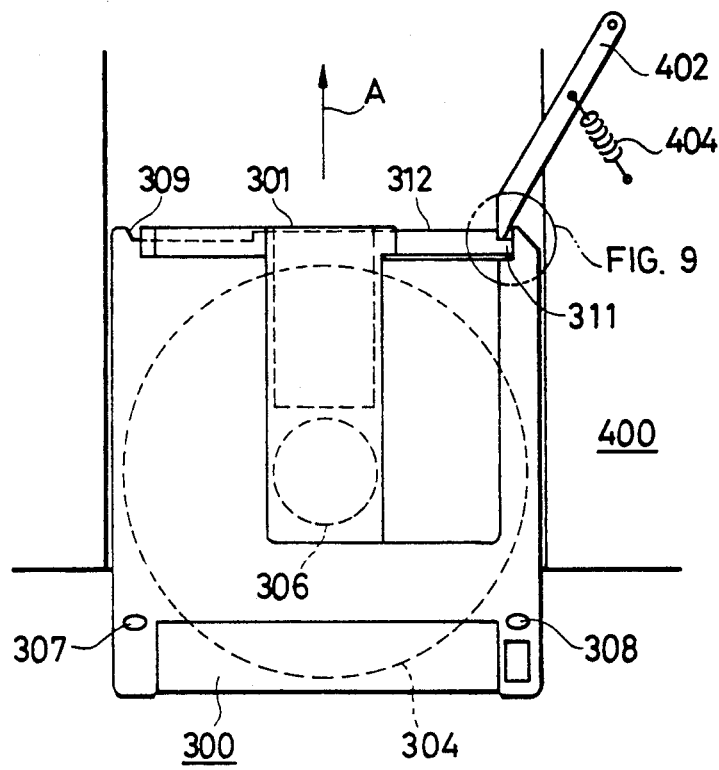
FIG. 8 shows a cartridge in accordance with the present invention to explain the principles thereof.

FIG. 8 shows the instance when the cartridge 300 of FIGS. 6 and 7 is erroneously inserted upside down into the reproducing apparatus 400. The bottom side of the cartridge 300 is shown in FIG. 8 in contrast to FIGS. 6 and 7 where the top side is shown. A notch or depression 311 serves as a stopper. The distance between the side edge of the shutter 30 and the right side of the cartridge 300 is indicated as L3 in FIG. 6. The distance from the beginning of the depression 311 to the left side of the cartridge 300 is indicated as L8 in FIG. 6. In this example, the distances L3 and L8 are 5 mm. Thus, the location of the side edge of the shutter 301 from the right side of the cartridge 300 in FIG. 6 and the location of the beginning of the depression 311 from the left side of the cartridge 300 in FIG. 8 are also the same.

When the cartridge 300 is inserted into the reproducing apparatus incorrectly as shown in FIG. 8, the edge of the lever 402 is caught by the depression 311, and the movement of the lever 402 is stopped. Therefore, the insertion of the cartridge is prevented.

If a depression is not provided in front of the cartridge 300 and the cartridge 300 is inserted with the wrong side up into the reproducing apparatus, the top edge of the lever 402 is not caught by any structure, and, as a result, the lever 402 can slide on the front edge 312 until the top edge of the lever 402 hits the right edge of the shutter 301. When the lever 402 hits the shutter 301, almost all of the cartridge has been inserted into the reproducing apparatus. If the user tries to push the remaining few millimeters of the cartridge into the reproducing apparatus by force, the shutter 301 or the lever 402 or both can break. The user may not be able to pull the cartridge 300 out from the reproducing apparatus if the cartridge has been forced.

In FIG. 8, an aperture 306 is provided for inserting a motor rotating portion (not shown) to rotate the optical disc 304. The aperture 306 is covered by the shutter 301 for preventing dust pollution. Location holes 307, 308 prescribe dimensions of parts of the cartridge 300. The location holes 307 and 308 are also used accurately to align the cartridge 300 in the cartridge inserting portion 400.

Figure 9:
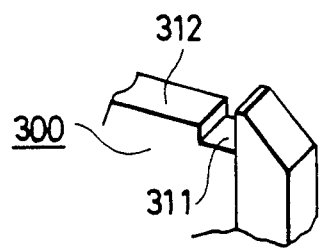
FIG. 9 is an enlarged perspective view of a depression shown in FIG. 8.

FIG. 9 shows on an enlarged scale in perspective the depression 311 shown in FIG. 8.

Figure 10A:
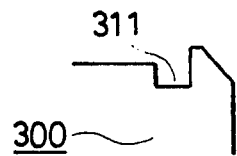
FIGS. 10A, 10B, 10C, 10D, 10E, 10F illustrate various embodiments of the depression shown in FIGS. 8 and 9.
Figure 10D:
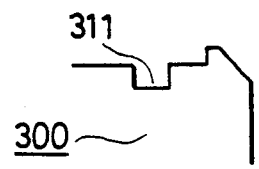
Figure 10B:
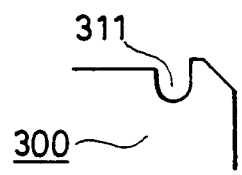
Figure 10E:
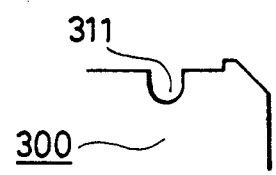
Figure 10C:
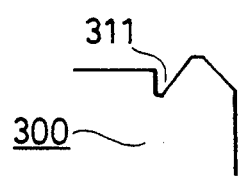
Figure 10F:
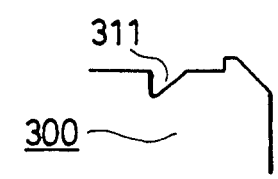

FIGS. 10A-10F show various embodiments of the depression shown in FIGS. 8 and 9. We have found different shapes and locations to be suitable. In FIGS. 10D, 10E and 10F, the depression 311 is located slightly leftwardly of the side of the cartridge 300 compared with the depressions shown in FIGS. 10A, 10B and 10C.

Figure 11A:
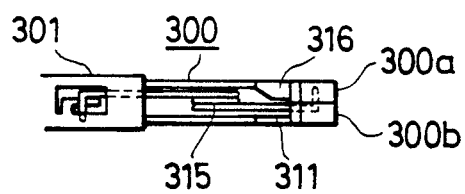
Figure 11B:
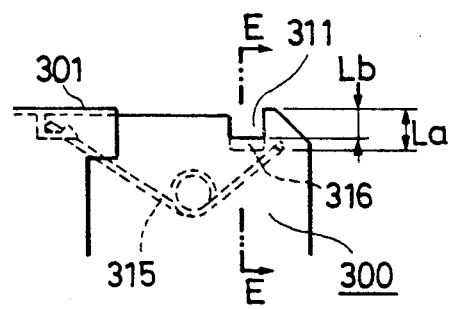
Figure 11C:
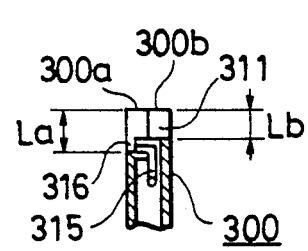

Normally, as the cartridge 300 is being taken out from the reproducing apparatus, the shutter 301 must be closed. A twisted coil spring is conventionally used for biasing the shutter to a closed position. The case of the cartridge 300 is typically constructed in two pieces. In FIGS. 11A-11C, the twisted coil spring 315 is fitted within the cartridge 300 so as to normally close the shutter 301 when the cartridge 300 is not inserted in the reproducing apparatus. The disc cartridge 300 consists of an upper case piece 300a and a lower case piece 300b. For fitting the twisted coil spring 315 in the cartridge 300 after fitting one of the ends of the coil spring 315 to the shutter 301, the other end of the coil spring 315 is put into the cartridge 300. The depression 311, 316 serving as the stopper is provided on respective case pieces 300b and 300a. The depression 316 is deeper than the depression 311 in order to make it easier to fit the coil spring 315 into the cartridge 300. The coil spring 315 can be put into the cartridge 300 by pushing one end of the spring 315 against the case piece 300b, because there is a difference of depths, La and Lb, at the respective depressions 316, 311 as shown in FIG. 11C.

According to the present invention, a cut-off portion is provided at head and side portion at an inserting side of a 3.5" erasable optical disc cartridge, and opposite to the location of a cut-off portion used in the 3.5" (86 mm) floppy disc cartridge. A stopper in a cartridge insertion portion of the reproducing apparatus is correspondingly located in operative relationship to the cut-off portion of the cartridge to prevent insertion of a different kind of cartridge into the reproducing apparatus or incorrect insertion of the proper cartridge.

A stopper such as a depression is provided at a front end of the cartridge at a location identical to an edge of the shutter on the other side of the cartridge where the shutter opening lever hits to prevent erroneous upside down insertion of the cartridge.

While we have shown and described several embodiments in accordance with our invention, it should be understood that the disclosed embodiments are susceptible of changes and modifications without departing from the scope of the invention. Therefore, we do not intend to be bound by the details shown and described herein but intend to cover all such changes and modifications a fall within the ambit of the appended claims.

We claim:

1. An optical disc cartridge for use with a data reproducing apparatus comprising:

a case having an aperture and an optical disc operatively arranged therein;

a shutter slidably associated with said case for selectively opening said aperture to expose said disc to reproduce data thereon;

a cut-off portion provided only at a head and left side corner of said case as viewed looking down on said case in a direction of insertion of said cartridge into said data reproducing apparatus; and a notch provided only at a head side of said case between said cut-off portion and a left side of said shutter when said shutter is closed as viewed looking down on said case in the insertion direction;

wherein spring means is provided in said case for biasing said shutter to a normally closed position; and wherein said case comprises an upper case piece and a lower case piece, and said notch is formed by an upper notch provided on said upper case piece and a lower notch provided on said lower case piece, one of said upper notch and said lower notch being larger than the other of said upper notch and said lower notch for ease of assembly said spring means in said case.

2. An optical disc cartridge for use with a data handling apparatus comprising:
- a case having an aperture and an optical disc operatively arranged therein;
- a shutter slidably associated with said case for selectively opening said aperture to expose said disc to handle data thereon, wherein said shutter is contacted and slid open by a shutter opening lever provided in said data handling apparatus when said cartridge is inserted into said data handling apparatus;
- a cut-off portion provided only at a head and left side corner of said case as viewed looking down on said case in a direction of insertion of said cartridge into said data handling apparatus;
- a shutter opening lever receiving portion provided at a head side of said case at a right side of said shutter when said shutter is closed as viewed looking down on said case in the insertion direction; and
- a depression provided only at the head side of said case to the left of a center line of said case as viewed looking down on said case in said insertion direction such that an edge of said depression is symmetric about said center line with respect to the right side of said shutter when said shutter is closed as viewed looking down on said case in the insertion direction.

3. An optical disc cartridge according to claim 2, wherein a shutter opening lever provided in said data handling apparatus contacts the head side of said case and the right side of said shutter at said shutter opening lever receiving portion and slides said shutter open when said optical disc cartridge is correctly inserted into said data handling apparatus, and wherein said depression engages said shutter opening lever and stops movement of said shutter opening lever when said optical disc cartridge is incorrectly inserted into said data handling apparatus.

4. An optical disc cartridge according to claim 3, wherein said depression has a wall portion which is effective for stopping said movement of said shutter opening lever when said optical disc cartridge is incorrectly inserted into said data handling apparatus.

5. An optical disc cartridge according to claim 2, wherein said shutter slides from right to left for opening said aperture.

6. An optical disc cartridge according to claim 2, wherein at least one hole is provided on said case for aligning said case in said data handling apparatus.

7. An optical disc cartridge according to claim 2, wherein spring means is provided in said case for biasing said shutter to a normally closed position.

8. An optical disc cartridge according to claim 2, wherein said case has a centrally located aperture for enabling rotation of said optical disc by a motor rotating portion provided in said data handling apparatus, and wherein said center line extends in the insertion direction through a center of said centrally located aperture.

9. An optical disc cartridge for use with a data reproducing apparatus comprising:
- a case having an aperture and an optical disc operatively arranged therein;
- a shutter slidably associated with said case for selectively opening said aperture to expose said disc to reproduce data thereon;
- a cut-off portion provided only at a head and left side corner of said case as viewed looking down on said case in a direction of insertion of said cartridge into said data reproducing apparatus;
- a shutter opening lever receiving portion provided at a head side of said case at a right edge of said shutter when said shutter is closed as viewed looking down on said case in the insertion direction; and
- a notch provided only at the head side of said case to the left of a center line of said case between said cut-off portion and a left side of said shutter when said shutter is closed as viewed looking down on said case in the insertion direction such that an edge of said notch is symmetric about said center line with respect to the right edge of said shutter when said shutter is closed as viewed looking down on said case in the insertion direction;
- wherein a shutter opening lever provided in said data reproducing apparatus contacts the head side of said case and the right edge of said shutter at said shutter opening lever receiving portion and slides said shutter open when said optical disc cartridge is correctly inserted into said data reproducing apparatus, and wherein said notch engages said shutter opening lever and stops movement of said shutter opening lever when said optical disc cartridge is incorrectly inserted into said data reproducing apparatus.

10. An optical disc cartridge according to claim 9, wherein said notch has a wall portion which is effective for stopping said movement of said shutter opening lever when said optical disc cartridge is incorrectly inserted into said data reproducing apparatus.

* * * * *